United States Patent Office 3,074,790
Patented Jan. 22, 1963

---

3,074,790
METHOD FOR THE CONTROL OF UNDESIRED VEGETATION
John K. Leasure, Midland, Mich., assignor to The Dow Chemical Company, Midland, Mich., a corporation of Delaware
No Drawing. Filed Mar. 30, 1960, Ser. No. 18,479
2 Claims. (Cl. 71—2.3)

This invention relates to herbicides and is particularly directed to a method for the suppression of the growth of germinant seeds, emerging seedlings and established plants of many undesirable plant species.

In recent years, the use of chemical materials for the control of vegetation has found widespread acceptance amongst agriculturalists. However, the practice of such control has brought into focus certain shortcomings in commonly employed procedures. For instance, many of the materials heretofore proposed as herbicides have the property of being capable of selectively controlling only broad leaf plant species. Further, may of the currently used materials are as toxic to established plants as they are to seeds. Thus, it has generally not been possible to obtain a selective control of small seeded annual weeds in stands of desirable perennial grasses such as blue grass, or stands of large seeded crop plants such a cotton and corn. Further, many of the herbicides have had only a transitory effect when employed in soil so that several applications have been required in order to obtain persistent control.

It is an object of the present invention to provide a new and improved method for the suppression and control of the growth of many undesirable plant species. Another object is to provide a method for the control of the growth of the germinant seeds and emerging seedlings of many small seeded undesirable plants in soil or growth media, and particularly of many small seeded annual plants. A further object is to provide a method for the suppression of the growth of many small seeded annual plants in stands of established perennial grasses such as blue grass, Bermuda grass and creeping red fescue, and in stands of large seeded crop plants such as cotton, beans and spinach. An additional object is the provision of a method wherein a single soil application gives a residual and extended control of plant growth. Other objects will become apparent from the following specification and claims.

According to the present invention, it has been found that the growth of many undesirable plants may be suppressed and controlled by exposing a part of the growing plant to the action of a phosphoroamidothioate having the formula

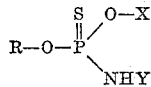

wherein R represents 2,4-dichlorophenyl, 3,4-dichlorophenyl or 2,4,5-trichlorophenyl; X represents lower alkyl and Y represents hydrogen or X. The term lower alkyl is employed in the present specification and claims to refer to the alkyl radicals containing from 1 to 4 carbon atoms, inclusive. More particularly, it has been discovered that the growth of the germinant seeds, emerging seedlings and established vegetation of many small seeded plants including millet, crab grass, pigweed, mustard, tickle grass, witch grass, nimblewill and fox tail may be controlled by exposing the seeds, emerging seedlings, or the roots or above ground portions of the plants to the action of a growth-inhibiting amount of phosphoroamidothioates. Moreover, it has been found that these compounds have a relatively high degree of toxicity for many undesirable small seeded annual plants and a much lower toxicity for such perennial grasses as blue grass, Zoysia, Bermuda grass, centipede grass, Saint Augustine grass and creeping red fescue and for large seeded crop plants such as pinto beans, cranberry beans, cotton, soybeans, peas, corn and wheat. Thus, the compounds may be employed for the selective control of many small seeded annual plants and particularly for the control of small seeded annual grasses in stands of many perennial grasses and in stands of many large seeded crop plants. Further, the compounds have a high degree of persistency in soil and give excellent controls of many undesirable plant species for periods ranging up to several months. The exposure of plants and plant parts to the action of phosphoroamidothioates gives rise to varying degrees of response in many germinant seeds, emerging seedings and growing plants depending upon the type of plant, the form and nature of the plant part contacted, the stage of growth or maturity of the plant and the dosage of toxicant employed. When very large dosages are dispersed in growth media a persistent inhibition of the growth of the seeds and plants of many small seeded plants is obtained. The weathering action of the sun, rain and possibly the decompositiotn of the phosphoroamidothioate compounds by the action of bacteria eventually reduces their concentration in the growth medium. The application of large dosages to the foliage of established vegetation suppresses the growth of many small seeded annual plant species and especially the growth of many annual grasses. Soil or foliar applications or more dilute dosages suppress the growth of the seeds and established plants of many small seeded annual plants while having little or no effect upon the seeds or established stands of many perennial grasses, or upon the seeds or established stands of many large seeded crop plants. Thus, it is possible to effect a selective control of many undesirable small seeded annual weeds and particularly the grasses of the sub-family Panicoideae such as common crab, fox tail, witch grass, tickle grass and millet in established stands of many perennial grasses and large seeded crop plants.

The exposure of the plant to a growth-inhibiting amount of the phosphoroamidothioates is essential for the practice of the present invention. The exact dosage to be employed to obtain such exposure is dependent upon such factors as soil type, depth to which the toxicant compounds are distributed in the soil and the amount of rain fall, as well as upon the plant species to be controlled and the stage of growth thereof. In non-selective operations, good results are obtained when the germinant seeds or established plants are exposed to dosages of from 2 to 100 pounds or more of the phosphoroamidothioate compounds per acre. In selective applications for the suppression of the growth of many small seeded annual weeds in established stands of perennial grasses and established stands of large seeded crop plants, a dosage of from 5 to 30 pounds of the phosphoroamidothioate compounds per acre is desirable.

The method of the present invention may be carried out by distributing the unmodified phosphoroamidothioates in growth media or upon the surfaces of the above ground portion of plants. However, the present method also embraces the employment of liquid or dust compositions containing the toxicants. In such usages, the toxicant compounds may be modified with one or a plurality of additaments or herbicide adjuvants including water or other liquid carriers, surface active dispersing agents and finely divided inert solids. Depending upon the concentration of toxicant, such augmented compositions are adapted to be distributed in soil or upon the above ground surfaces of plants, or to be employed as concentrates and subsequently diluted with additional inert carrier to produce the ultimate treating compositions.

The exact concentration of the phosphoroamidothioates to be employed in the compositions is not critical and may vary considerably provided the required dosage of effective agent is supplied in the growth medium or upon the plant foliage. The concentration of toxicant in liquid compositions employed to supply the desired dosage generally is from about 0.01 to 50 percent by weight, although concentrations as high as 85 percent by weight are sometimes employed. The concentration of toxicant in organic solvent compositions is generally from about 5 to 85 percent by weight. With aqueous compositions, the required dosage is generally supplied with compositions containing from 0.01 to 50 percent by weight, although concentrations of 0.0002 percent by weight conveniently may be employed in irrigation treatments of soil. In dusts, the concentration of toxicant may be from 1 to 50 percent by weight, although concentrations as low as 0.1 percent by weight are sometimes employed. In compositions to be employed in concentrations, the toxicant oftentimes is present in concentration of from 5 to 95 percent by weight.

The quantity of treating composition to be applied may vary considerably provided that the required dosage of active ingredient is applied in sufficient of the finished composition to cover adequately the vegetation to be treated or to facilitate the penetration and distribution of said ingredient in growth media. The required amount of the active ingredient in the soil conveniently may be supplied per acre treated in from 10 to 27,000 gallons or more of the liquid carrier or in from 50 to 2,000 pounds of the inert solid carrier. In the treatment of seedling weeds, good coverage is obtained when using from 10 to 60 gallons of finished spray composition per acre. Where large succulent vegetation is concerned, it is frequently desirable to employ up to 250 gallons or more of the finished spray composition per acre to assure complete coverage of the above ground portion of the vegetation. In the application of dusts to plant foliage, good results are obtained with from 40 to 200 pounds of finished dust per acre, the only requirement being that the required toxicant dosage be supplied in sufficient dust to achieve good coverage of the foliage.

Liquid compositions containing the desired amount of active ingredient may be prepared by dispersing the toxicants in water or an organic liquid, with or without the aid of a suitable surface active dispersing agent such as an ionic or non-ionic emulsifying agent. Suitable organic liquid carriers include the agricultural spray oils and the petroleum distillates such as diesel fuel, kerosene, fuel oil, naphthas and Stoddard solvent. Among the latter the petroleum distillates are generally preferred. The aqueous compositions may contain one or more water immiscible solvents for the toxicant ingredient. In such compositions, the carrier comprises an aqueous emulsion, i.e., a mixture of water, emulsifying agent and water immiscible solvent. In the liquid compositions, the choice of dispersing and emulsifying agent and the amount thereof employed is dictated by the nature of the composition and by the ability of the agent to facilitate the dispersion of the toxicant compounds in the carrier to produce the desired composition. Generally, the surface active agents are employed in the amount of from 1 to 20 percent by weight of the combined weight of the phosphoroamidothioate and agent. Dispersing and emulsifying agents which may be employed in the compositions include the condensation products of alkylene oxides with phenols and organic acids, alkyl aryl sulfonates, polyoxyalkylene derivatives of sorbitan esters, complex ether alcohols, mahogany soaps and the like.

In preparation of dust compositions, the active ingredient is dispersed in and on a finely divided inert solid such as clay, talc, chalk, gypsum and the like. In such operations, the finely divided carrier is mechanically mixed or ground with the phosphoroamidothioates. Similarly, dust compositions containing the toxicant compounds may be prepared from various of the solid surface active dispersing agents such as bentonite, fuller's earth, attapulgite and other clays. Depending upon the proportion of ingredients, these dust compositions may be employed as concentrates and subsequently diluted with additional solid surface active dispersing agent or with chalk, talc or gypsum and the like to obtain the desired amount of active ingredient in a composition adapted to be employed for the suppression of the growth of plants. Also, such dust compositions may be dispersed in water, with or without the aid of a dispersing agent, to form spray mixtures. In a further embodiment, such dust compositions may be formulated in the form of granules as the active agent dispersed on an inert granular carrier to produce granular herbicide compositions.

When operating in accordance with the present invention, growth altering amounts of phosphoroamidothioates are dispersed in soil or growth media in any convenient fashion. Applications to growth media may be carried out by simply mixing with the media, by applying to the surface of soil and thereafter dragging or discing into the soil to the desired depth, or by employing a liquid carrier to accomplish the penetration and impregnation. The application of spray and dust compositions to the surface of soil or to the above ground surfaces of plants may be carried out by conventional methods, e.g. power dusters, boom and hand sprayers and spray dusters.

In a further method, the distribution of the phosphoroamidothioates in soil may be accomplished by introducing the toxicants in the water employed to irrigate the soil. In such procedures, the amount of water may be varied with the porosity and water holding capacity of the soil to obtain a desired depth of distribution of the toxicants.

The following examples illustrate the invention but are not to be construed as limiting:

*Example 1*

Four parts by weight of O-(2,4-dichlorophenyl) O-methyl N-isopropyl phosphoroamidothioate, 0.08 part of sorbitan trioleate (Span 85) and 0.02 part of a sorbitan monolaurate polyoxyethylene derivative (Tween 80) were dispersed in 40 milliliters of acetone to produce a concentrate composition in the form of a water dispersible liquid. A portion of this concentrate composition was dispersed in water to produce aqueous spray compositions containing 0.0172, 0.0432 and 0.172 pound of O-(2,4-dichlorophenyl) O-methyl N-isopropyl phosphoroamidothioate per 100 gallons of ultimate mixture. These aqueous compositions were employed for the treatment of soil and observations made of the control of the growth of the seeds and emerging seedlings of various small and large seeded plants. The large seeded plants included cotton, radish, soybeans, corn, wheat and white pea beans and the small seeded plants included Japanese millet, German millet, crab grass, giant fox tail and Johnson grass. In the determinations, the compositions were employed to treat seed beds which had been prepared and seeded with the named plant species. In the treating operations, the compositions were applied as a soil drench and at a rate of about 0.434 acre inch of aqueous composition per acre to supply substantially uniform dosages of about 2, 5 and 20 pounds, respectively, of O-(2,4-dichlorophenyl) O-methyl N-isopropyl phosphoroamidothioate per acre. These dosages correspond, respectively, to concentrations of about 3.2, 8 and 32 parts by weight of the phosphoroamidothioate compound per million parts by weight of soil. Other areas similarly seeded with the named plant species were left untreated to serve as checks.

After about four weeks, the areas were examined to ascertain what control of the growth of seeds and emerging seedlings had been obtained. The results are set forth in the following table:

| Seed Species | Percent Control of Growth of Seeds and Emerging Seedlings at the Various Indicated Concentrations of Toxicant in the Treated Seed Beds | | |
|---|---|---|---|
| | 3.2 p.p.m. | 8 p.p.m. | 32 p.p.m. |
| Cotton | 0 | 0 | 0 |
| Soybeans | 0 | 0 | 0 |
| Radish | 0 | 0 | 0 |
| Corn | 0 | 0 | 0 |
| Wheat | 0 | 0 | 0 |
| White Pea Beans | 0 | 0 | 0 |
| Japanese Millet | 60 | 90 | 98 |
| German Millet | 95 | 98 | 100 |
| Crab Grass | 95 | 100 | 100 |
| Giant Foxtail | 40 | 75 | 85 |
| Johnson Grass | | 20 | 98 |

At the time of the observations, the check beds were found to support luxuriant and vigorously growing stands of the named plant species.

*Example 2*

Water dispersible concentrate compositions were prepared from O-(3,4-dichlorophenyl) O-methyl N-isopropyl phosphoroamidothioate and O-(2,4,5-trichlorophenyl) O-ethyl N-methyl phosphoroamidothioate in the manner exactly as described in Example 1, and portions of the resulting concentrates dispersed in water to prepare aqueous compositions containing 0.0432 pound of one of the phosphoroamidothioate compounds per 100 gallons of ultimate mixture. These aqueous compositions were employed as described in Example 1 for the treatment of soil and observations made of the control of the growth of the seeds and emerging seedlings of various small and large seeded plants. The planting and treating operations were all as previously described with the compositions being employed in an amount sufficient to supply 5 pounds of one of the phosphoroamidothioates compounds per acre. This dosage corresponds to a concentration of about 8 parts by weight of phosphoroamidothioate per million parts by weight of soil.

After about four weeks, the areas were examined to ascertain what control of the growth of seeds and emerging seedlings had been obtained. The results are set forth in the following table.

| Seed Species | Percent Control of the Growth of Seeds and Emerging Seedlings | |
|---|---|---|
| | O-(3,4-Dichlorophenyl) O-Methyl N-Isopropyl Phosphoroamidothioate | O-(2,4,5-Trichlorophenyl) O-Ethyl N-Methyl Phosphoroamidothioate |
| Cotton | 0 | 0 |
| Soybeans | 0 | 0 |
| Radish | 0 | 0 |
| Flax | 0 | 0 |
| Corn | 0 | 0 |
| Wheat | 0 | 0 |
| Japanese Millet | 95 | 90 |
| German Millet | 100 | 90 |
| Crab Grass | 85 | 90 |

At the time of the observations, the check areas showed vigorously growing stands of the named plant species.

*Example 3*

Water dispersible concentrate compositions were prepared from various phosphoroamidothioates exactly as described in Example 1, and portions of the resulting concentrates dispersed in water to produce aqueous compositions containing 0.172 pound of one of the phosphoroamidothioate compounds per 100 gallons of ultimate mixture. These aqueous compositions were employed as described in Example 1 for the treatment of soil planted with the seeds of various small and large seeded plants. The planting and treating operations were all as previously described with the compositions being employed in amounts sufficient to supply 20 pounds of one of the phosphoroamidothioate compounds per acre. This dosage corresponds to a concentrate of about 32 parts by weight of phosphoroamidothioate per million parts by weight of soil.

After about four weeks, the seed beds were examined to ascertain what control of the growth of seeds and emerging seedlings had been obtained. The results are set forth in the following table.

| Phosphoroamidothioate employed as Test Compound | Percent Control of Growth of the Seeds and Emerging Seedlings of the Various Indicated Plant Species | | | | | | |
|---|---|---|---|---|---|---|---|
| | Cotton | Soybean | Radish | Corn | Wheat | German Millet | Crab Grass |
| O-(2,4-Dichlorophenyl) O-Methyl N-n-Propyl | 0 | 0 | 0 | 0 | 0 | 100 | 100 |
| O-(3,4-Dichlorophenyl) O-Methyl N-Ethyl | 0 | 0 | 10 | 0 | 0 | 100 | 100 |
| O-(2,4-Dichlorophenyl) O-Ethyl N-Methyl | 0 | 0 | 0 | 0 | 0 | 95 | 95 |
| O-(2,4-Dichlorophenyl) O-Ethyl N-n-Propyl | 0 | 0 | 0 | 0 | 0 | 85 | 85 |
| O-(3,4-Dichlorophenyl) O-Ethyl | 0 | 0 | 10 | 0 | 0 | | 95 |
| O-(3,4-Dichlorophenyl) O-Ethyl N-Methyl | 0 | 0 | 0 | 0 | 0 | 80 | 100 |
| O-(2,4,5-Trichlorophenyl) O-Methyl N-Isopropyl | 0 | 0 | 0 | 0 | | 97 | 95 |

At the time of the observations, the check areas showed vigorously growing stands of the named plant species.

*Example 4*

Portions of various of the water dispersible concentrate compositions as described in Examples 1, 2 and 3 were dispersed in water to prepare aqueous compositions containing 2,000 parts by weight of one of the phosphoroamidothioate compounds per million parts of ultimate mixture. These compositions were applied to the foliage of plots of various small seeded and large seeded plants. At the time of application, the large seeded plants were about 4 inches tall and the small seeded plants about 1½ inches tall. The treatments were carried out with conventional spraying equipment, the plants being sprayed at a rate of 3.3 pounds of one of the phosphoroamidothioate compounds per acre. Similar plots of the various plant species were left untreated to serve as checks. After three weeks, the plots were examined to ascertain what control of the growth of the plants had been obtained. The results are set forth in the following table:

| Phosphoroamidothioate Employed as Test Compound | Percent Control of the Growth of the Indicated Plant Species | | | | | |
|---|---|---|---|---|---|---|
| | Cotton | Soybeans | Radish | Corn | German Millet | Crab Grass |
| O-(2,4-Dichlorophenyl) O-Methyl N,Isopropyl | 0 | 0 | 0 | 0 | 95 | 95 |
| O-(3,4-Dichlorophenyl) O-Methyl N-Isoporpyl | 0 | 0 | 0 | 0 | 90 | 95 |
| O-(2,4-Dichlorophenyl) O-Ethyl N-n-Propyl | 0 | 0 | 0 | 0 | 80 | 100 |
| O-(3,4-Dichlorophenyl) O-Ethyl | 0 | 10 | 0 | 0 | | 90 |
| O-(3,4-Dichlorophenyl) O-Ethyl N-Methyl | 0 | 0 | 0 | 0 | 80 | 80 |

At the time of the observations, the check plots supported abundant stands of the named plant species.

Example 5

Portions of the water dispersible concentrate compositions of Examples 1 and 3 were dispersed in water to prepare aqueous spray compositions containing 10,000 parts of one of the phosphoroamidothioate compounds per million parts by weight of ultimate mixture, and the resulting compositions applied to the foliage of cotton, corn, Japanese millet and crab grass. At the time of treatment, the cotton and corn were about 4 inches tall and the other plant species from 1 to 1½ inches tall. The treatment was carried out with conventional spraying equipment, the application being made at a dosage of 16.5 pounds of one of the phosphoroamidothioate compounds per acre. Similar plots of the named plant species were left untreated to serve as checks. After three weeks the plots were examined to ascertain what control of the growth had been obtained. The results are set forth in the following table:

| Phosphoroamidothioate employed as test Compound | Percent Control of the Growth of the Named Plant Species | | | | |
|---|---|---|---|---|---|
| | Cotton | Corn | Japanese Millet | German Millet | Crab Grass |
| O-(2,4-Dichlorophenyl) O-Methyl N-Isopropyl | 0 | 0 | 95 | 100 | 100 |
| O-(2,4-Dichlorophenyl) O-Ethyl N-Methyl | 0 | 10 | 98 | 90 | 100 |
| O-(2,4-Dichlorophenyl) O-Ethyl N-n-Propyl | 0 | 10 | 100 | 95 | 95 |
| O-(3,4-Dichlorophenyl) O-Ethyl | 0 | 0 | 80 | 70 | 100 |
| O-(2,4-Dichlorophenyl) O-Methyl N-n-propyl | 0 | 0 | 98 | 100 | 95 |

At the time of the observations, vigorously growing stands of the named plant species were found in the check plots.

Example 6

Twenty-five parts by weight of O-(2,4-dichlorophenyl) O-butyl N-isopropyl phosphoroamidothioate, 65 parts of Xylene and 10 parts of an alkylated aryl polyether alcohol (Triton X-100) are mechanically mixed together to prepare a liquid emulsifiable concentrate composition.

In a similar manner 90 parts by weight of O-(3,4-dichlorophenyl) O-methyl phosphoroamidothioate, and 10 parts of a sorbitan monolaurate polyoxyethylene derivative (Tween 20) are mixed together to prepare a concentrate composition in the form of a water dispersible liquid.

Also, 25 parts by weight of O-(2,4,5-trichlorophenyl) O-methyl N-butyl phosphoroamidothioate, 60 parts of fuller's earth, 10 parts of diatomaceous earth, 2 parts of an alkyl sulfonate (Nacconal NR) and one part of a polymerized sodium salt of substituted benzoid alkyl sulfonic acids (Daxad No. 27) are mechanically mixed and ground together to prepare a concentrate composition in the form of a wettable powder.

These concentrate compositions may be dispersed in water to prepare aqueous compositions which have very desirable wetting and penetrating properties. The latter aqueous compositions are adapted to be employed to distribute the phosphoroamidothioate compounds in the soil or upon the foliage of plants in growth inhibiting amounts.

Example 7

25.5 parts by weight of O-(2,4-dichlorophenyl) O-methyl N-isopropyl phosphoroamidothioate, 5.3 parts of an alkylated aryl polyether alcohol (Triton X-155), 2.7 parts of a sodium alkyl aryl sulfonate (Carlisle Base 136-B) and 66.5 parts of xylene are mechanically mixed together to prepare a concentrate composition in the form of an emulsifiable liquid. This concentrate composition was dispersed in water to prepare aqueous compositions, one containing 20 pounds and the other 10 pounds of the phosphoroamidothioate compound per 250 gallons of ultimate mixture. These compositions were employed for the treatment of an established turf of Kentucky blue grass containing a very heavy infestation of crab grass. In the treating operations, the compositions were applied with conventional spraying equipment to the foliage of the turf at dosages of 20 and 10 pounds, respectively, per acre. Adjacent areas of turf were left untreated to serve as checks.

After 18 weeks the turf was critically inspected and a 98 and 85 percent control of crab grass observed at the treatment dosages of 20 and 10 pounds per acre, respectively. The Kentucky blue grass was found unharmed by the treatments with the stands of the latter grass being more luxuriant than in the check areas where the crab grass had flourished at the expense of the blue grass.

Example 8

An aqueous dispersion containing 0.172 pound of O-(2,4-dichlorophenyl) O-methyl N-isopropyl phosphoroamidothioate per 100 gallons of ultimate mixture is employed for the treatment of soil which has been prepared and seeded with the seeds of pigweed and cotton. In the treating operations the composition is applied as a soil drench and at a rate of about 0.43 acre inch of aqueous composition per acre to supply a substantially uniform dosage of about 20 pounds of the phosphoroamidothioate compound per acre. Other seed beds similarly planted with the seeds of pigweed and cotton are left untreated to serve as checks. After one week, inspection of the treated seed beds shows a 100 percent control of the seeds and emerging seedlings of pigweed, and substantially complete germination and growth of cotton with the plants being of a size and maturity not different from those in the untreated check beds, which contain a heavy stand of vigorously growing pigweed and cotton seedlings.

This application is a continuation-in-part of my prior application, Serial No. 718,443 filed March 3, 1958, now abandoned.

The term "plant part" as employed in the present specification and claims is intended to be inclusive of the stems, branches, roots, foliage and germinant seeds of plants. The expression "growth media and soil" are herein employed in their broadest sense to be inclusive of all conventional "soils" as defined in Webster's New International Dictionary, second edition, unabridged, published in 1937 by G. and C. Merriam Company, Springfield, Massachusetts. Thus the terms refer to any substance or media in which vegetation may take root and grow, and are intended to include not only earth but compost, manure, muck, humus, and sand and the like, adapted to support plant growth.

I claim:

1. A method which comprises applying to growing plants and plant parts of small seeded grass species a growth inhibiting amount of O-(2,4-dichlorophenyl) O-methyl N-isopropyl phosphoroamidothioate.

2. A method which comprises applying to growing plants and plant parts of crab grass, a growth inhibiting amount of O-(2,4-dichlorophenyl) O-methyl N-isopropyl phosphoroamidothioate.

References Cited in the file of this patent

UNITED STATES PATENTS

| 2,552,541 | Drake et al. | Mar. 15, 1951 |
| 2,552,574 | Moyle et al. | May 15, 1951 |
| 2,831,015 | Tolkmith | Apr. 15, 1958 |
| 3,005,749 | Youngson | Oct. 24, 1961 |

OTHER REFERENCES

Gojmerac in "J. Econ. Entomol.," vol. 49, 1956, pp. 710, 711.

Levine et al. in "Chemical Abstracts," vol. 50, 1956, col. 4406(d).